United States Patent
Baudoin et al.

(10) Patent No.: US 11,368,439 B2
(45) Date of Patent: *Jun. 21, 2022

(54) STORING DECRYPTED BODY OF MESSAGE AND KEY USED TO ENCRYPT AND DECRYPT BODY OF MESSAGE

(71) Applicant: Google LLC, Mountain View, CA (US)

(72) Inventors: Laetitia Baudoin, Cupertino, CA (US); Brian Goodman, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/806,357

(22) Filed: Mar. 2, 2020

(65) Prior Publication Data

US 2020/0259806 A1 Aug. 13, 2020

Related U.S. Application Data

(63) Continuation of application No. 16/024,115, filed on Jun. 29, 2018, now Pat. No. 10,616,189, which is a
(Continued)

(51) Int. Cl.
*G06F 21/00* (2013.01)
*H04L 29/06* (2006.01)
(Continued)

(52) U.S. Cl.
CPC ...... *H04L 63/0435* (2013.01); *G06F 12/0246* (2013.01); *G06F 12/1408* (2013.01);
(Continued)

(58) Field of Classification Search
CPC combination set(s) only.
See application file for complete search history.

(56) References Cited

U.S. PATENT DOCUMENTS

| 6,567,914 B1 | 5/2003 | Just et al. |
| 8,837,739 B1 * | 9/2014 | Sexton ................ H04L 63/0464 380/282 |

(Continued)

FOREIGN PATENT DOCUMENTS

WO 2017066180 A1 4/2017

OTHER PUBLICATIONS

International Preliminary Report on Patentability for International Application PCT/US2016/056411, dated Apr. 26, 2018, 9 pages.
(Continued)

*Primary Examiner* — Lisa C Lewis
(74) *Attorney, Agent, or Firm* — Brake Hughes Bellermann LLP

(57) ABSTRACT

A non-transitory computer-readable storage medium comprising instructions stored thereon. When executed by at least one processor, the instructions may be configured to cause a computing system to at least receive a message, the message including a header, an encrypted symmetric key, and an encrypted body, decrypt the encrypted symmetric key using a private key to generate a decrypted symmetric key, decrypt the encrypted body using the decrypted symmetric key to generate a decrypted body, and store the header, the decrypted symmetric key, and the decrypted body in long-term storage.

20 Claims, 12 Drawing Sheets

Related U.S. Application Data continuation of application No. 14/882,233, filed on Oct. 13, 2015, now Pat. No. 10,038,675.

(51) Int. Cl.
  *H04L 9/40* (2022.01)
  *H04L 9/32* (2006.01)
  *H04L 9/08* (2006.01)
  *G06F 12/02* (2006.01)
  *G06F 12/14* (2006.01)

(52) U.S. Cl.
  CPC .......... *H04L 9/0816* (2013.01); *H04L 9/0819* (2013.01); *H04L 9/0822* (2013.01); *H04L 9/0825* (2013.01); *H04L 9/3263* (2013.01); *H04L 63/061* (2013.01); *H04L 63/123* (2013.01); *G06F 2212/1052* (2013.01); *H04L 2209/76* (2013.01)

(56) References Cited

U.S. PATENT DOCUMENTS

| | | | |
|---|---|---|---|
| 10,038,675 B2 | 7/2018 | Baudoin et al. | |
| 2004/0243814 A1* | 12/2004 | Nakano | H04L 9/3268 713/189 |
| 2005/0160292 A1 | 7/2005 | Batthish et al. | |
| 2010/0031028 A1* | 2/2010 | Adams | H04L 9/3263 713/156 |
| 2011/0117883 A1* | 5/2011 | Drabo | H04L 51/38 455/411 |
| 2012/0128156 A1 | 5/2012 | Sherkin et al. | |
| 2012/0204032 A1 | 8/2012 | Wilkins et al. | |
| 2012/0226905 A1* | 9/2012 | Mohanty | H04W 12/03 713/168 |
| 2013/0031366 A1* | 1/2013 | Simske | H04L 9/3247 713/168 |
| 2013/0073850 A1 | 3/2013 | Zaverucha et al. | |
| 2015/0039889 A1* | 2/2015 | Andoni | H04L 9/0825 713/170 |
| 2016/0134594 A1* | 5/2016 | Teo | H04L 63/045 713/171 |
| 2017/0078255 A1* | 3/2017 | Nejadian | H04L 63/06 |
| 2017/0104731 A1* | 4/2017 | Baudoin | H04L 63/0435 |
| 2020/0084029 A1* | 3/2020 | Yang | H04L 63/061 |

OTHER PUBLICATIONS

"ChangeLog File forzlib", retrieved on Aug. 4, 2015 from www.zlib.net/ChangeLog.txt, 25 pages.

Ateniese, et al., "Improved Proxy Re-encryption Schemes with Applications to Secure Distributed Storage", ACM Transactions on Information and System Security, vol. 9, No. 1, Feb. 2006, 30 pages.

Borenstein, et al., "MIME (Multipurpose Internet Mail Extensions) Part One: Mechanisms for Specifying and Describing the Format of Internet Message Bodies", Network Working Group, Sep. 1993, 75 pages.

Gutmann, "Compressed Data Content Type for Cryptographic Message Syntax (CMS)", Network Working Group, Jun. 2002, 6 pages.

Housley, "Cryptographic Message Syntax (CMS)", Network Working Group, Sep. 2009, 56 pages.

Korn, et al., "The VCDIFF Generic Differencing and Compression Data Format", Network Working Group, Jun. 2002, 29 pages.

Lijun, et al., "Secure Emails in XML Format Using Web Services", Fifth European Conference on Web Services, Nov. 1, 2007, pp. 129-136.

International Search Report and Written Opinion for PCT Application No. PCT/US2016/56411, dated Jan. 17, 2017, 14 pages.

Ramsdell, et al., "Secure/Multipurpose Internet Mail Extensions (S/MIME) Version 3.2 Message Specification", IETF, Jan. 2010, 45 pages.

U.S. Appl. No. 14/882,233, filed Oct. 13, 2015, Issued.
U.S. Appl. No. 16/024,115, filed Jun. 29, 2018, Allowed.

* cited by examiner

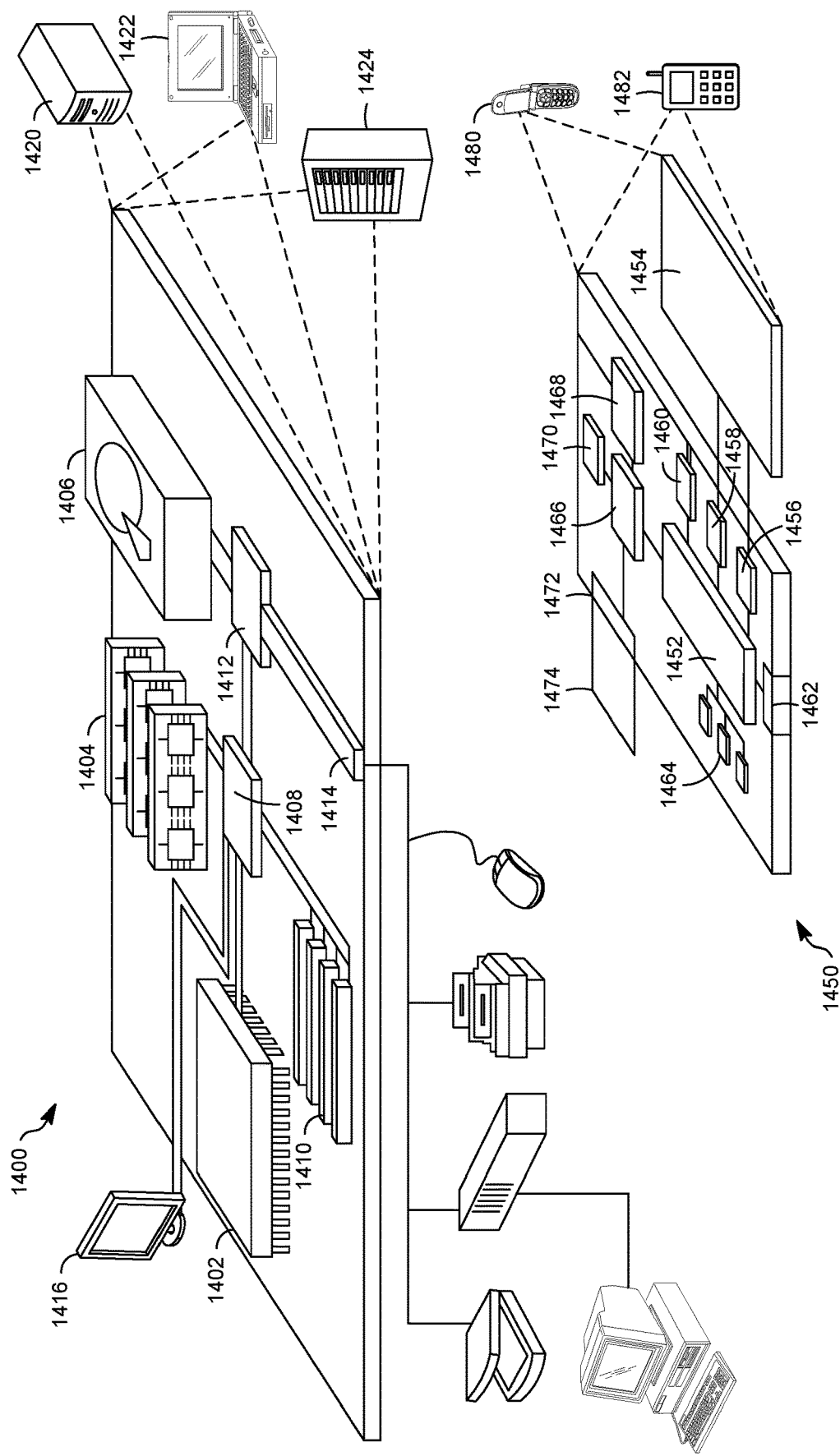

STORING DECRYPTED BODY OF MESSAGE AND KEY USED TO ENCRYPT AND DECRYPT BODY OF MESSAGE

CROSS-REFERENCE TO RELATED APPLICATIONS

This application is a Continuation of, and claims priority to, U.S. patent application Ser. No. 16/024,115, filed on Jun. 29, 2018, entitled "STORING DECRYPTED BODY OF MESSAGE AND KEY USED TO ENCRYPT AND DECRYPT BODY OF MESSAGE", which is a continuation of U.S. patent application Ser. No. 14/882,233, filed on Oct. 13, 2015, entitled "STORING DECRYPTED BODY OF MESSAGE AND KEY USED TO ENCRYPT AND DECRYPT BODY OF MESSAGE", now U.S. Pat. No. 10,038,675, the disclosures of which are incorporated by reference herein in their entireties.

TECHNICAL FIELD

This description relates to storing messages that were encrypted when the messages were received.

BACKGROUND

Parts of messages may be encrypted to prevent unauthorized persons from reading the messages. Decryption may be a slow process. If the messages are stored in encrypted form, the decryption may create undesirable latency when a user requests to read the messages in decrypted form. If the messages are stored in decrypted form, then the encrypted messages may not be available for forwarding to third parties. Storing the messages in both the encrypted form and the decrypted form may increase storage costs.

SUMMARY

Bodies of messages may be stored in decrypted form, along with the key used to encrypt and decrypt the bodies of the messages. The original headers may also be stored. The stored messages may be readily available for viewing in decrypted form. The stored key may allow the bodies of the messages to be re-encrypted, so that copies of the original, encrypted messages may be forwarded to third parties.

According to one example, a non-transitory computer-readable storage medium comprising instructions stored thereon. When executed by at least one processor, the instructions may be configured to cause a computing system to at least receive a message, the message including a header, an encrypted symmetric key, and an encrypted body, decrypt the encrypted symmetric key using a private key to generate a decrypted symmetric key, decrypt the encrypted body using the decrypted symmetric key to generate a decrypted body, and store the header, the decrypted symmetric key, and the decrypted body in long-term storage.

According to another example, a non-transitory computer-readable storage medium comprising instructions stored thereon. When executed by at least one processor, the instructions may be configured to cause a computing system to receive a message. The message may include a primary header including a sender of the message and a recipient of the message, a cryptographic message syntax (CMS) header identifying at least one recipient and including at least one encrypted copy of a symmetric key encrypted according to a public key associated with the at least one recipient, and an encrypted body encrypted according to the symmetric key. The instructions may also be configured to cause the computing system to decrypt the at least one encrypted copy of the symmetric key using a private key associated with the at least one recipient to generate a decrypted symmetric key, decrypt the encrypted body using the decrypted symmetric key to generate a decrypted body, re-encrypt the decrypted symmetric key to generate a re-encrypted symmetric key, and store the primary header, the identification of the at least one recipient, the re-encrypted symmetric key, and the decrypted body, in long-term storage.

According to another example, a non-transitory computer-readable storage medium comprising instructions stored thereon. When executed by at least one processor, the instructions may be configured to cause a computing system to receive a message. The message may include a primary header including a sender of the message and a recipient of the message, a cryptographic message syntax (CMS) header including at least a first identifier, identifying a first recipient, and a first copy of a symmetric key, the first copy of the symmetric key being encrypted according to a first public key associated with the first recipient and a second identifier, identifying a second recipient, and a second copy of the symmetric key, the second copy of the symmetric key being encrypted according to a second public key associated with the second recipient, and an encrypted body encrypted according to the symmetric key. The instructions may also be configured to cause the computing system to decrypt the first copy of the symmetric key using a private key associated with the first recipient to generate a decrypted symmetric key, decrypt the encrypted body using the decrypted symmetric key to generate a decrypted body, the decrypted body including length indicators indicating lengths of lines of data in the decrypted body, erase the encrypted body after decrypting the encrypted body, re-encrypt the decrypted symmetric key, using a key associated with the computing system, to generate a re-encrypted symmetric key, store the primary header, the first identifier, the second identifier, the re-encrypted symmetric key, the decrypted body, and the length indicators, in long-term storage, respond to a request to read the message by displaying the stored decrypted body, and respond to a request to forward the message to a forwarding recipient by, re-encrypting the decrypted body using the re-encrypted symmetric key, re-generating the first copy of the symmetric key, the regenerating the first copy of the symmetric key including decrypting the re-encrypted symmetric key according to the key associated with the computing system and re-encrypting the symmetric key according to a public key associated with the first recipient and corresponding to the private key associated with the first recipient, and sending the primary header, the re-generated symmetric key, and the re-encrypted body to the recipient.

The details of one or more implementations are set forth in the accompanying drawings and the description below. Other features will be apparent from the description and drawings, and from the claims.

BRIEF DESCRIPTION OF THE DRAWINGS

FIG. 14 shows an example of a computer device and a mobile computer device that can be used to implement the techniques described here.

DETAILED DESCRIPTION

This disclosure describes reducing storage requirements while storing a decrypted version of a message, which may be an email message, to reduce latency in presenting the message and maintaining the ability to forward a copy of the original, encrypted message. The encrypted body of the message is decrypted using a key, which may be a symmetric key, that is used to encrypt and decrypt the body. A header of the message, the key used to encrypt and decrypt the body, and the decrypted body may be stored. Storing the header and decrypted body may allow the message to be presented to a user without the latency associated with decrypting the body. Storing the key may allow the body to be re-encrypted to re-generate and forward the original message.

Re-encrypting the body to re-generate the original message enables the exact original message to be re-created. Re-creating the original message maintains the signature of the original message, which may be included in a signature Cryptographic Message Syntax (CMS) header, signed message parts, a CMS trailer, multipart/signed headers, signed data, signature headers, and/or a CMS signature. Maintaining the signature of the original message allows the sender of the original message to be authenticated without needing to use (and/or have access to) the private key of the entity that signed the original message. Recreating the original message also enables maintaining multiple encrypted versions of the symmetric key that can be decrypted by multiple recipients using their respective private keys.

Figure 1:
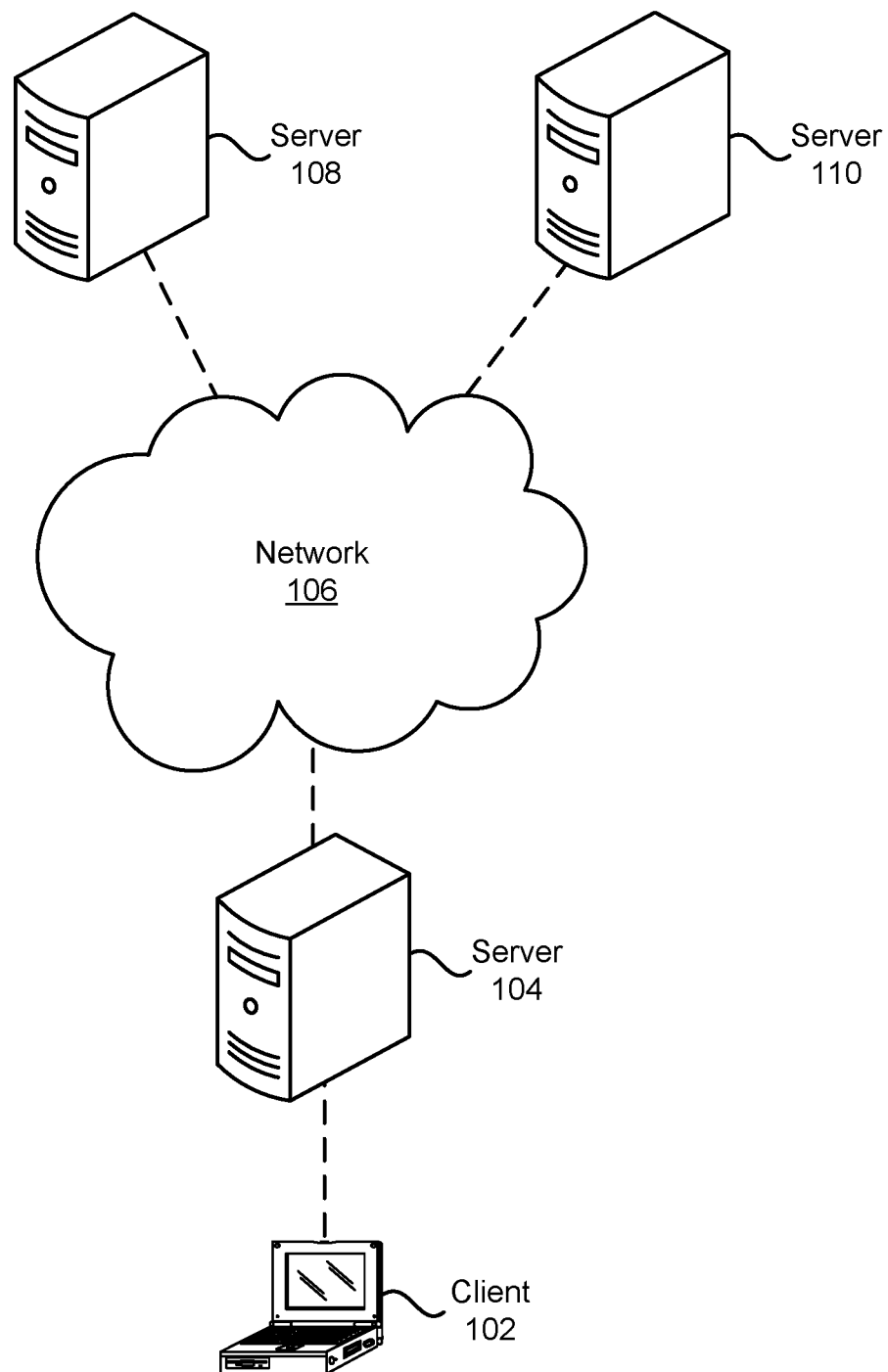
FIG. 1 is a diagram of a network and devices that may perform some of the techniques described herein.

FIG. 1 is a diagram of an electronic network 106 and devices 102, 104, 108, 110 that may perform some of the techniques described herein. Servers 104, 108, 110 may communicate with each other via the network 106, which may be the Internet. The servers 104, 108, 110 may send and receive email messages to and from each other. To prevent unauthorized persons or entities from accessing the contents of the email messages, portions and/or fields of the email messages, such as the bodies of the email messages, may be encrypted. The bodies of the received email messages may be decrypted by the servers 104, 108, 110 and/or by clients 102 that receive messages from the servers 104, 108, 110.

In the example shown in FIG. 1, the server 104 may send and/or present email messages to a client 102. The client 102 may include a desktop computer, laptop or notebook computer, thin client, netbook, tablet computer, or smartphone, as non-limiting examples. The decryption and storage described herein may be performed by the server 104, which presents the email messages to the client 102, by the client 102 which receives the email messages from the server 104, or by a combination of the server 104 and client 102, according to example implementations.

Figure 2:
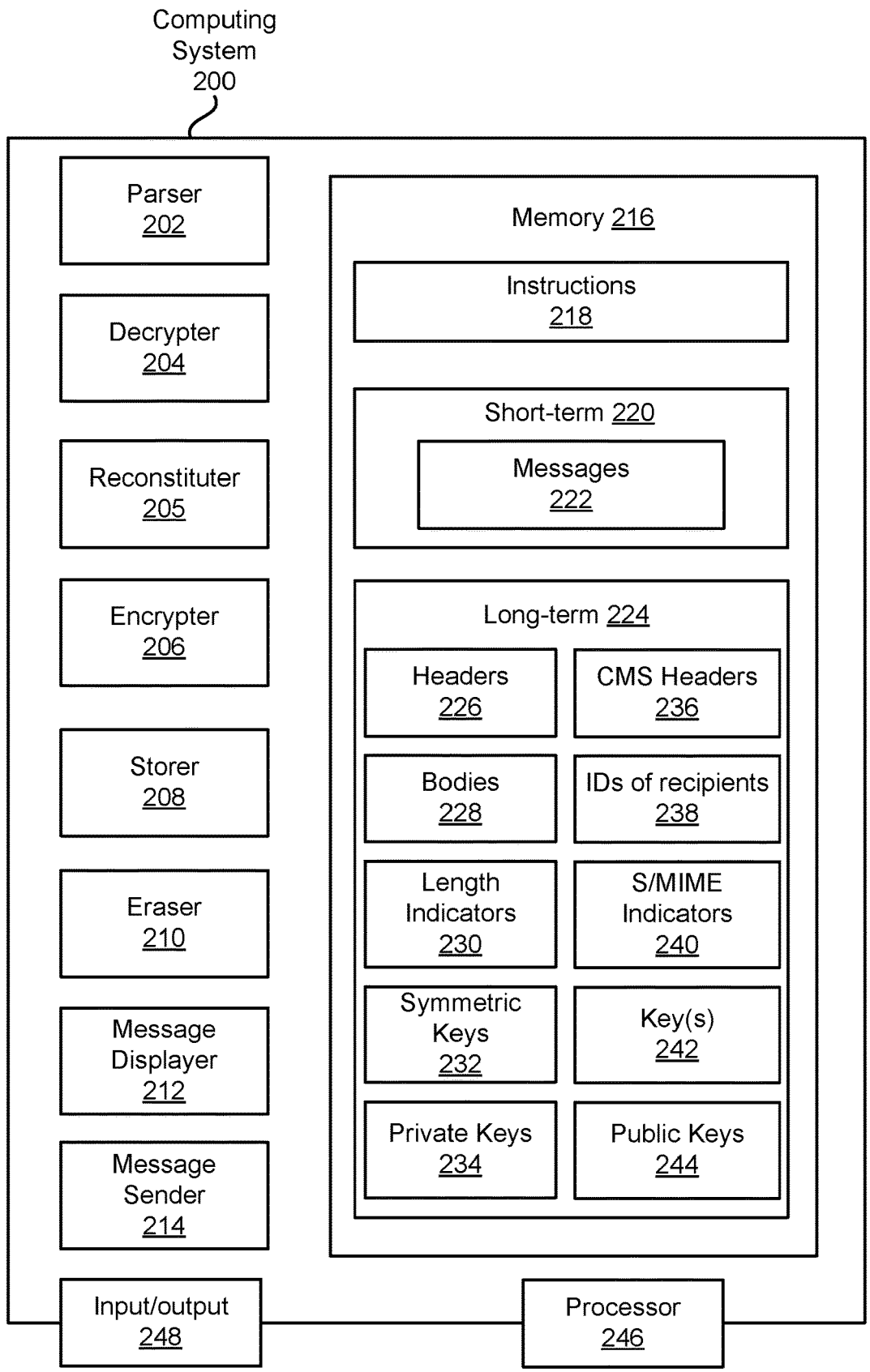
FIG. 2 is a diagram of a computing system according to an example implementation.

FIG. 2 is a diagram of a computing system 200 according to an example implementation. The computing system 200 may include the server 104, the client 102, a combination of the server 104 and client 102, or any combination of computing devices, according to example implementations.

The computing system 200 may include a parser 202. The parser 202 may parse messages into different portions and/or fields. The parser 202 may parse the messages, which may be email messages, into fields such as a header, an encrypted key, and an encrypted body.

The computing system 200 may include a decrypter 204. The decrypter 204 may decrypt fields included in messages according to keys, such as symmetric keys and/or private keys associated with public keys in a public key infrastructure (PKI). The decrypter 204 may decrypt, for example, encrypted keys included in messages and encrypted bodies included in messages.

The computing system 200 may include a reconstituter 205. The reconstituter 205 may reconstitute portions of a message, such as by reconstructing the data fields 704, 708 (shown in FIG. 7) based on the lengths indicated by the tag and length fields 702, 706. Reconstituting the messages may restore the original line lengths and/or chunk sizes of the messages.

The computing system 200 may include an encrypter 206. The encrypter 206 may encrypt portions and/or fields of messages, and/or keys, using encryption keys. The encrypter 206 may encrypt and/or re-encrypt portions and/or fields of messages using public keys and/or symmetric keys, and may encrypt and/or re-encrypt keys using public keys and/or keys stored on and/or associated with the computing system 200. The encrypter 206 may encrypt and/or re-encrypt keys for secure storage on the computing system 200, and/or may encrypt and/or re-encrypt decrypted bodies of messages to regenerate the encrypted bodies so that the messages may be forwarded with the bodies in the original, encrypted form.

The computing system 200 may include a storer 208. The storer 208 may store portions of messages, including decrypted portions of the messages, and keys, in the long-term storage 224 portion of the memory 216. The storer 208 may store, for example, headers of messages, decrypted keys generated by decrypting encrypted keys included in messages, and decrypted bodies generated by decrypting encrypted bodies included in messages. The storer 208 may also store public keys used to encrypt portions of messages, private keys used to decrypt portions of messages, and keys used to encrypt keys for secure storage on the computing system 200.

The computing system 200 may include an eraser 210. The eraser 210 may erase and/or delete portions of messages that will not be stored. The eraser 210 may, for example, erase and/or delete an encrypted body after the encrypted body has been decrypted, leaving only the decrypted body to be stored, thereby saving storage space and/or memory.

The computing system 200 may include a message displayer 212. The message displayer 212 may display, and/or generate data for displaying, messages such as email messages on a display of a computing device such as the client 102 shown in FIG. 1, in response to instructions and/or input from a user, such as a request to read the message. The message displayer 212 may display the messages after the decrypter 204 has decrypted the bodies of the messages. The message displayer 212 may respond, for example, to a request to read a message by displaying the stored decrypted body. The message displayer 212 may respond to the request to read the message by displaying the stored decrypted body and the sender and recipient indicated by the header included in the message, according to an example implementation. The message displayer 212 may, for example, respond to the request to read the message by retrieving the header and the decrypted body from the long-term storage 224 and displaying the header, and/or the sender and recipient included in the header, and the stored decrypted body.

The computing system 200 may include a message sender 214. The message sender 214 may generate and send messages in response to instructions and/or input from the user. The instructions and/or input from the user may be either an explicit action (such as explicitly forwarding the email), or more indirect (for example configuring a mail filtering rule that will automatically forward messages matching certain criteria), according to example implementations. The message sender 214 may, for example, generate and send a message in response to a request to forward a previously received message. The message sender 214 may re-generate the original, encrypted message to forward the message to a third party and/or provide an application programming interface (API) such as Internet Message Access Protocol (IMAP) and/or Post Office Protocol 3 (POP3). The message sender 214 may, in response to a request to forward a previously received message, re-encrypt the stored decrypted body using the decrypted symmetric key, re-encrypt the decrypted symmetric key using a public key associated with the private key used to decrypt the symmetric key, and send the message to the recipient identified in the header, the message including the header, re-encrypted symmetric key, and the re-encrypted body.

The computing system may include a memory 216. The memory 216 may include at least one non-transitory computer-readable storage medium, such as a storage device. The memory 216 may include instructions 218. The instructions 218, when executed by at least one processor, may be configured to cause the computing system 200 to perform any combination of the methods, functions, and/or processes described herein.

The memory 216 may include short-term memory 220. The short-term memory 220 may be the main memory and/or working memory of the computing system 200, and may have relatively fast access and/or low latency when compared to long-term storage 224. The short-term memory 220 may include one or more dynamic random access memory (DRAM) devices and/or one or more static random access memory (SRAM) devices, according to example embodiments. The short-term memory 220 may store messages 222 when they are received, parsed, decrypted, reconstituted, encrypted, stored, displayed, and/or sent, until the messages are erased.

The long-term storage 224 may store headers 226 of messages. The long-term storage 224 may have a larger memory space and/or storage capacity than the short-term memory 220, but may have slower access and/or higher latency than the short-term memory 220. The long-term storage 224 may include one or more magnetic disks, magnetic tape, and/or one or more flash drives. The headers 226 may include a from field identifying a sender, such as an email address of the sender, a to field identifying a recipient, such as an email address of the recipient, and/or a subject field indicating a subject of the message. In some example implementations, the subject field may be stored as part of the body of the message.

The long-term storage 224 may store bodies 228 of messages. The stored bodies 228 may have been decrypted by the decrypter 204. The bodies 228 may include subject lines of the messages, text included in the messages, and/or attachments included in the messages.

The long-term storage 224 may store length indicators 230. The length indicators 230 may have been included in the messages, and may indicate line lengths within the messages. The reconstituter 205 may use the length indicators 230 to reconstitute messages by reconstructing the message into lines and/or chunks based on the lengths indicated by the length indicators 230.

The long-term storage 224 may store symmetric keys 232. The symmetric keys 232 may be keys that are used both to encrypt and decrypt portions of messages, such the bodies of the messages. The symmetric keys 232 may have been included in the messages in encrypted form, and may have been decrypted by the decrypter 204 using private keys associated with recipients of the respective messages. The symmetric keys 232 may be stored in decrypted form, or may be re-encrypted by the encrypter 206 before encryption so that the symmetric keys 232 may not be accessed by unauthorized parties.

The long-term storage 224 may store private keys 234. Private keys 234 may be keys used for decryption of portions of messages that were encrypted using public keys according to a public key infrastructure (PKI). The private keys 234 may be associated with potential recipients of messages. The private keys 234 stored in the computing system 200 may be associated with persons who have accounts with an administrator of the computing system 200.

The long-term storage 224 may also store Cryptographic Message Syntax (CMS) headers 236. The CMS headers 236 may have been included in the encrypted bodies of the messages, and may have been decrypted by the decrypter 204.

The long-term storage 224 may store identifications (IDs) of recipients 238 of the messages. The IDs of the recipients 238 may be included in the messages, such as in the CMS headers 236, and may be associated with the symmetric keys 232 used to encrypt the bodies of the messages.

The long-term storage 224 may store Secure Multipurpose Internet Mail Extension (S/MIME) indicators 240. The S/MIME indicators 240 may include digital signatures for the messages.

The long-term storage 224 may store keys 242 associated with the computing system 200. The encrypter 206 may use the keys 242 to encrypt the symmetric keys 232, and any other portion of messages, prior to storage to prevent unauthorized persons or entities from accessing the symmetric keys or other portions.

The long-term storage 224 may store public keys 244. The public keys 244 may be associated with recipients of messages according to a PKI infrastructure. The computing system 200 may store public keys 244 associated with persons who have accounts associated with an administrator of the computing system 200, or may retrieve public keys 244 when the public keys 244 are needed to re-encrypt portions of messages.

The computing system 200 may include the at least one processor 246. The at least one processor 246 may execute instructions, such as the instructions 218 stored in memory 216, to cause the computing system 200 to perform any combination of the methods, functions, and/or techniques described herein.

The computing system 200 may also include an input/output module 248. The input/output module 248 may include one or more input interfaces and one or more output interfaces. The input interfaces and output interfaces may include wired or wireless nodes for communicating with other computing systems, such as servers and/or clients. The input interface(s) may include a keyboard, mouse, touchscreen, and/or microphone, as non-limiting examples. The output interface(s) may include a display and/or speaker, as non-limiting examples.

Figure 3:
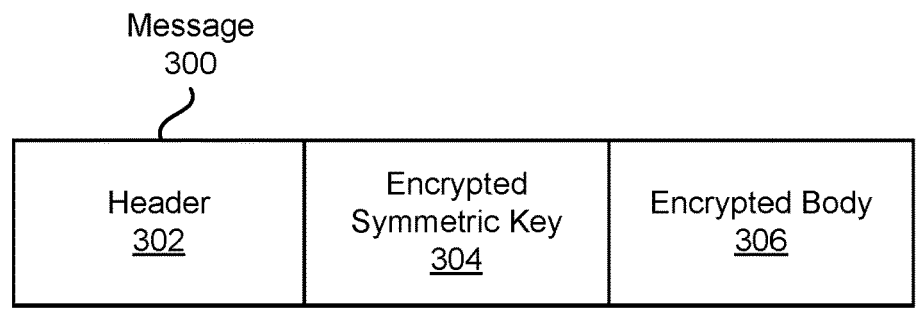
FIG. 3 is a diagram of a message according to an example implementation.

FIG. 3 is a diagram of a message 300 according to an example implementation. In this example, the computing system 200 may have received a message 300, which may be an email message. The computing system 200 may have received the message 300 via the electronic network 106, which may be the Internet. The message 300 may include a header 302, an encrypted symmetric key 304, and an encrypted body 306. The parser 202 may parse the received message 300 into the header 302, the key, which may be the encrypted symmetric key 304, and the body, which may be the encrypted body 306.

The encrypted symmetric key 304 may include a symmetric key that was encrypted according to a public key associated with a recipient of the message 300. The symmetric key 304 may have been randomly generated by a sender of the message 300. The computing system 200 may have stored a private key associated with the public key and/or with the recipient, such as in a private keys 234 portion of long-term storage 224 included in memory 216 of the computing system 200. The decrypter 204 may decrypt the encrypted symmetric key 304 using the private key to generate a decrypted symmetric key. After decrypting the encrypted symmetric key 304 to generate the decrypted symmetric key, the decrypter 204 may decrypt the encrypted body 306 using the decrypted symmetric key to generate a decrypted body. After the encrypted body 306 has been decrypted, the decrypted body and header 302 may be available for presentation and viewing as an email message, with from and to fields and a body.

The encrypter 206 may re-encrypt the decrypted symmetric key to generate a re-encrypted symmetric key. The encrypter 206 may re-encrypt the decrypted symmetric key using the public key associated with the recipient of the message 300 to generate the re-encrypted symmetric key in response to an instruction to forward the message 300, so that the re-encrypted symmetric key can be included in a copy of the message 300 that appears to include the original encrypted symmetric key 304. The encrypter 206 may re-encrypt the decrypted symmetric key using a key associated with and/or stored on the computing system 200 to store the symmetric key with an encryption that will render the symmetric key inaccessible by unauthorized persons and/or parties. The storer 208 may store the decrypted symmetric key in the symmetric keys 232 portion of long-term storage 224 to later re-encrypt the decrypted body to regenerate the encrypted body 306 as part of regenerating the original message 300 to send and/or forward a copy of the original message 300 to third parties.

The storer 208 may store the header 302, the decrypted symmetric key, and the decrypted body, in the long-term storage 224. The storer 208 may not store the encrypted body 306 after decrypting the encrypted body 306. Not storing the encrypted body 306 may save storage space in the memory 216. In the example in which the encrypter 206 encrypts the symmetric key using the key associated with and/or stored on the computing system 200, the storer may store the re-encrypted symmetric key with the encryption that will render the symmetric key inaccessible by unauthorized persons, parties, and/or entities. Any combination of the methods, techniques, and/or processes described with respect to the message 300 shown in FIG. 3 may also be applied to the message 400 shown in FIG. 4, described below.

Figure 4:
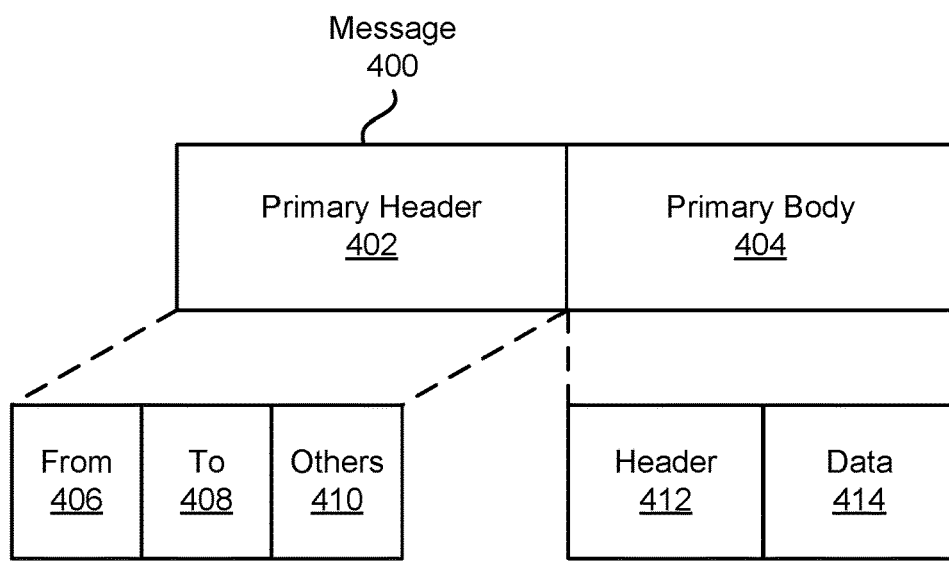
FIG. 4 is a diagram of a message according to another example implementation.

FIG. 4 is a diagram of a message 400 according to another example implementation. In this example, the message 400 may be encrypted according to a Cryptographic Message Syntax (CMS) protocol.

In this example, the parser 202 may parse the message 400 into a primary header 402 and a primary body 404. The parser 202 may parse the primary header 402 into a from field 406 indicating a sender of the message 400 (such as by an email address(es) of one or more senders), a to field 408 indicating a recipient of the message 400 (such as by an email address of a recipient), and other fields 410. The primary body 404 may include portions and/or fields that are encrypted, as described below. The parser 202 may parse the primary body 404 into a header field 412 and a data field 414.

Figure 5:
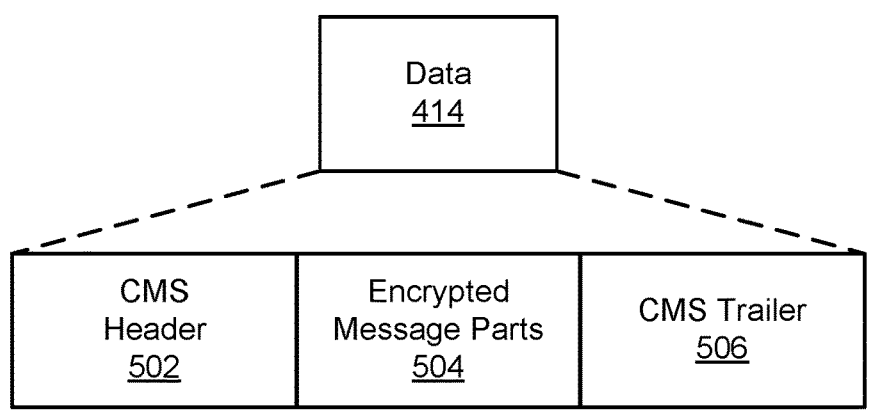
FIG. 5 is a diagram of a data field included in the message shown in FIG. 4 according to an example implementation.

FIG. 5 is a diagram of the data field 414 included in the message 400 shown in FIG. 4 according to an example implementation. In this example, the parser 202 may parse the data field 414 into a Cryptographic Message Syntax (CMS) header 502, an encrypted message parts field 504, and a CMS trailer 506.

Figure 6:
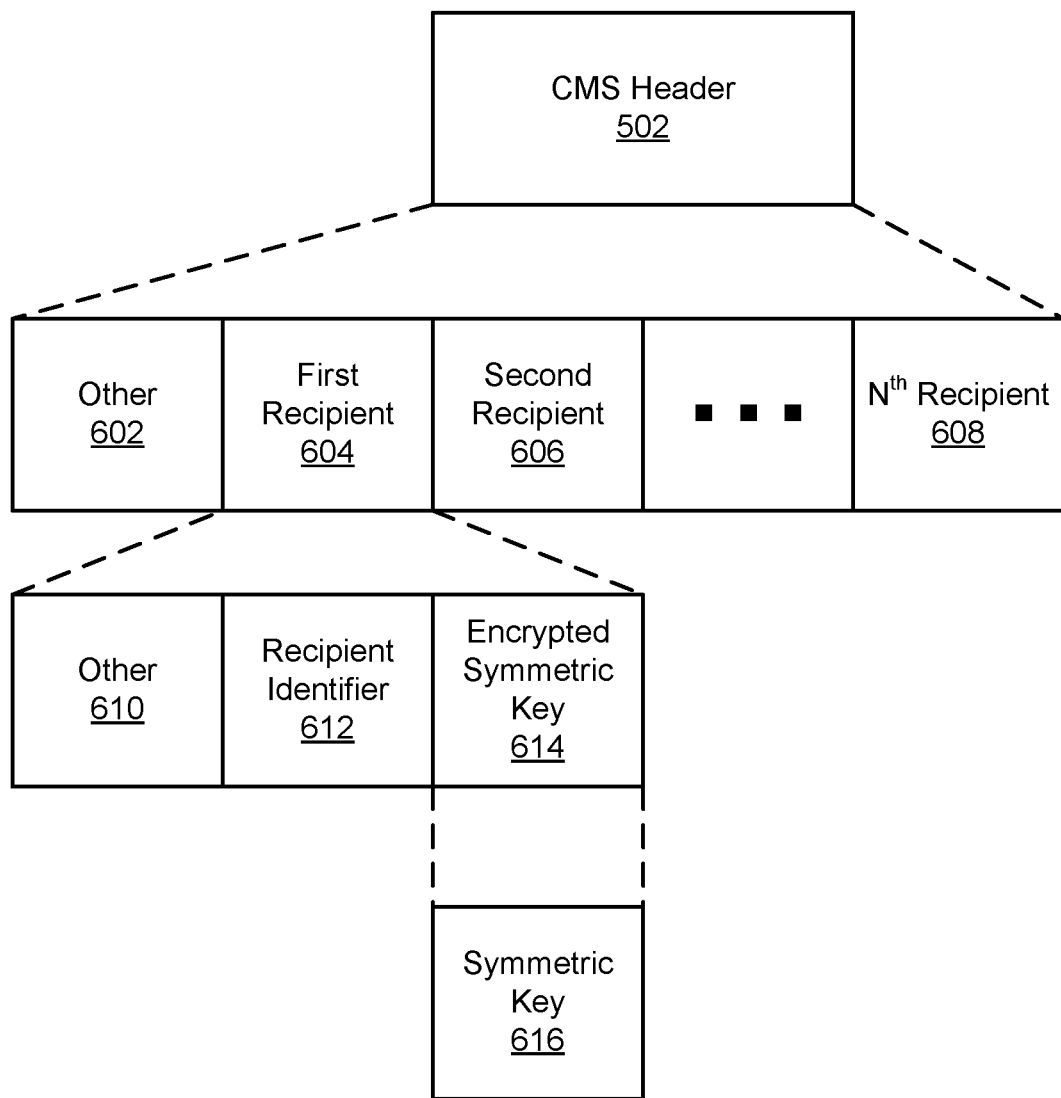
FIG. 6 is a diagram of a Cryptographic Message Syntax (CMS) header included in the data field shown in FIG. 5 according to an example implementation.

FIG. 6 is a diagram of the CMS header 502 included in the data field 414 shown in FIG. 5 according to an example implementation. In this example, the parser 202 may parse the CMS header 502 into different recipient fields 604, 606, 608, as well as other fields 602. The parser 202 may parse each recipient field 604, 606, 608, including a first recipient field 604, into a recipient identifier field 612, an encrypted symmetric key field 614, and other fields 610. The CMS header 502 may include an encrypted symmetric key 614 for each recipient 604, 606, 608, encrypted according to the respective recipient's 604, 606, 608 public key(s) (in an example in which a recipient 604, 606, 608 has more than one public key, the CMS header 502 may include multiple versions of the symmetric key, encrypted according to the different public keys associated with the recipient 604, 606, 608). The recipient identifiers 612 included in the recipient fields 604, 606, 608 may identify recipients who are authorized to view the contents of the message 400, and for whom the symmetric key 616 has been encrypted using a public key associated with the respective recipient, and for whom the respective recipient's private key will decrypt the symmetric key 616, enabling the recipient to decrypt the encrypted message parts 504.

In the example shown in FIG. 6, the decrypter 204 may decrypt an encrypted symmetric key field 614 according to a private key associated with a recipient of the message 400 identified in the recipient identifier field 612 to generate a decrypted symmetric key 616. The symmetric key 616 may have been randomly generated by a sender of the message 400. The decrypted symmetric key 616 may be used by the encrypter 206 and decrypter 204 to encrypt and decrypt the encrypted message parts 504. The storer 208 may store the decrypted symmetric key 616 in the symmetric keys 232 portion of long-term storage 224 to later re-encrypt the decrypted body 714 (described below) to regenerate the encrypted message parts 504 as part of regenerating the original message 400 to send and/or forward a copy of the original message 400 to third parties.

Figure 7:
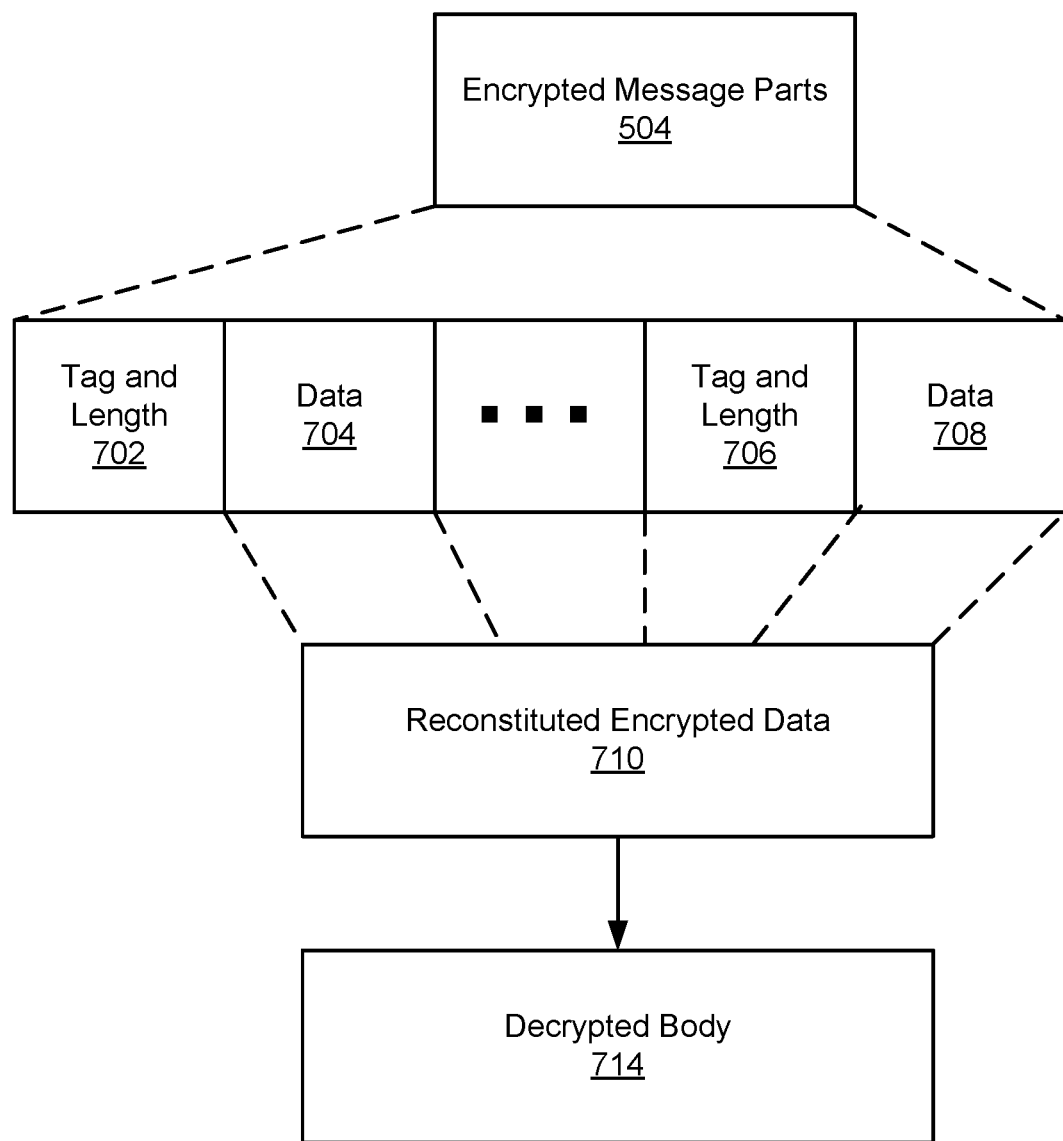
FIG. 7 is a diagram of an encrypted message parts field included in the data field shown in FIG. 5, fields included in the encrypted message parts field, and a decrypted body generated based on the encrypted message parts field and a decryption key, according to an example implementation.

FIG. 7 is a diagram of the encrypted message parts field 504 included in the data field 414 shown in FIG. 5, fields included in the encrypted message parts field 504, and a decrypted body 714 generated based on the encrypted message parts field 504 and a decryption key, according to an example implementation. In this example, the parser 202 may parse the encrypted message parts field 504 into tag and length fields 702, 706 and data fields 704, 708. In the example shown in FIG. 7, the tag and length field 702 is paired with the data field 704, and the tag and length field 706 is paired with the data field 708. Multiple other tag and length fields may be paired with multiple other data fields included in the encrypted message parts field 504, as shown by the ellipses. The tag and length fields 702, 706 may indicate line lengths of data within the message 400.

The reconstituter 205 may reconstitute portions of a message, such as by reconstructing the data fields 704, 708 based on the lengths indicated by the tag and length fields 702, 706. The reconstituter 205 may reconstitute the data fields 704, 708 based on the lengths indicated by the tag and length fields 702, 706 to generate reconstituted encrypted data 710. The decrypter 204 may decrypt the reconstituted encrypted data 710 using the symmetric key 616 to generate a decrypted body 714.

In an example described with respect to FIGS. 4 through 7, the original message 400 may be made up of the primary header 402 and the primary body 404, and the decrypted message may be made up of the primary header 402 and the decrypted body 714. The header 412 and decrypted body 714 may be sufficient for the message displayer 212 to display the message 400 to a user in response to a read request. The computing system 200 may store in long-term storage 224, and use to regenerate the original message 400 in response to a request to send and/or forward the message 400 to a third party, an S/MIME header included in the header 412, the length of each line included in the tag and length fields 702, 706, the CMS header 502 and CMS trailer 506, and the symmetric key 616.

Figure 8:
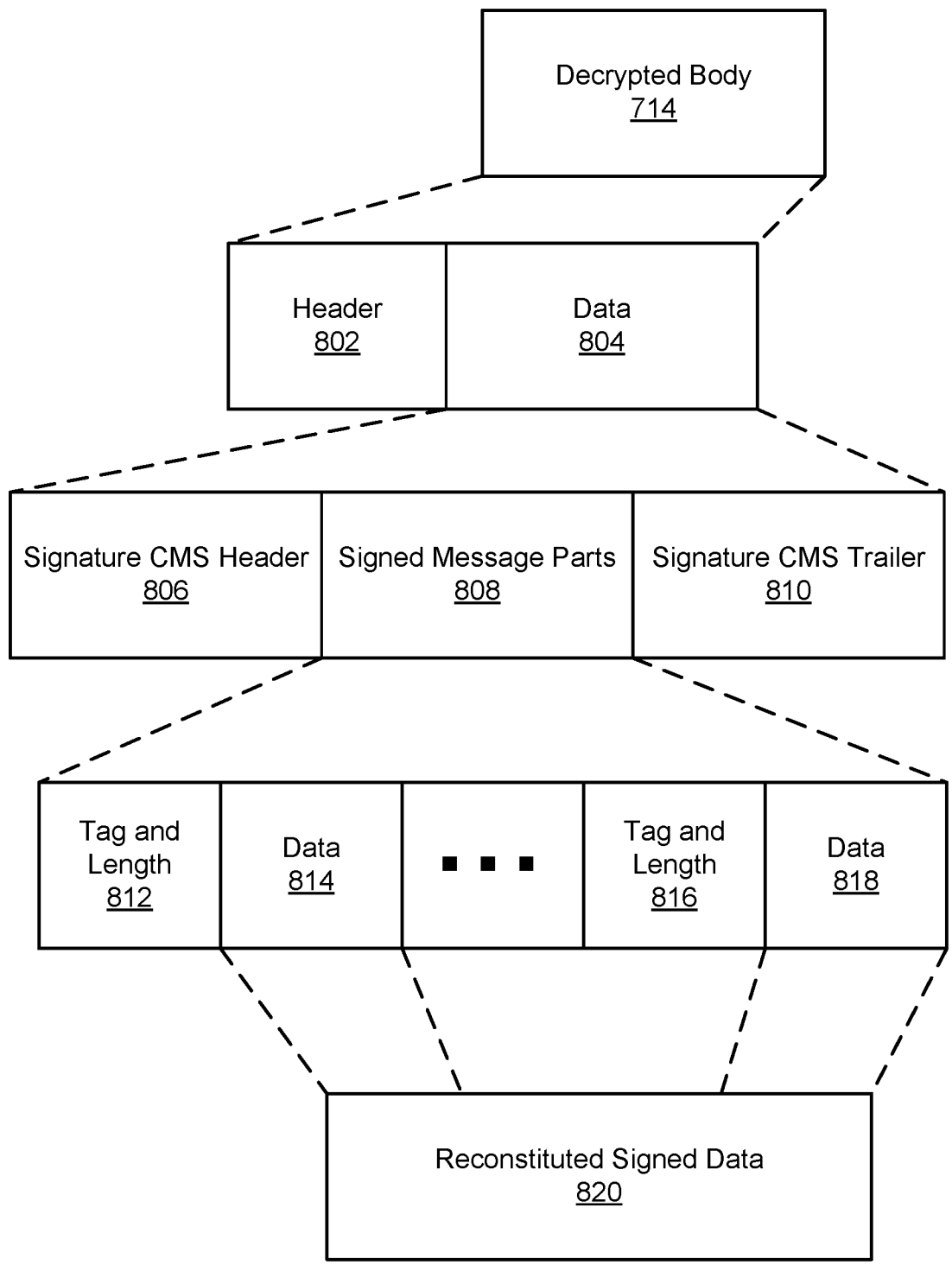
FIG. 8 is a diagram of fields included in the decrypted body shown in FIG. 7, fields included in the decrypted body, and reconstituted signed data generated based on the fields included in the decrypted body, according to an example implementation.

FIG. 8 is a diagram of fields included in the decrypted body 714 shown in FIG. 7, fields included in the decrypted body 714, and reconstituted signed data 820 generated based on the fields included in the decrypted body 714, according to an example implementation. In this example, the parser 202 may parse the decrypted body 714 into a header 802 (which may include S/MIME signature headers), and a data field 804. The header 802 may include indicators of a sender and a recipient of the message 400.

The parser 202 may parse the data field 804 into a signature CMS header 806, signed message parts 808, and a signature CMS trailer 810. The parser 202 may parse the signed message parts 808 into tag and length fields 812, 816 indicating lengths of chunks of data, and data fields 814, 818. The reconstituter 205 may reconstitute the data fields 814, 818 based on the lengths indicated by the tag and length fields 812, 816 to generate reconstituted signed data 820.

In the example described with respect to FIG. 4-8, the original message 400 may include the primary header 402 and primary body 404. The primary header 402 and reconstituted signed data 820 may be sufficient for the message displayer 212 to display the message 400 to a user in response to a read request. The computing system 200 may store in long-term storage 224, and use to regenerate the original message 400 in response to a request to send and/or forward the message 400 to a third party, the S/MIME headers included in the header 412, the length indicators included in the tag and length fields 812, 816, the CMS header 502 and CMS trailer 506, the symmetric key 616, the S/MIME signature headers included in the header 412, the signature CMS header 806, the signature CMS trailer 810, and the length indicators included in the tag and length fields 812, 816.

Figure 9:
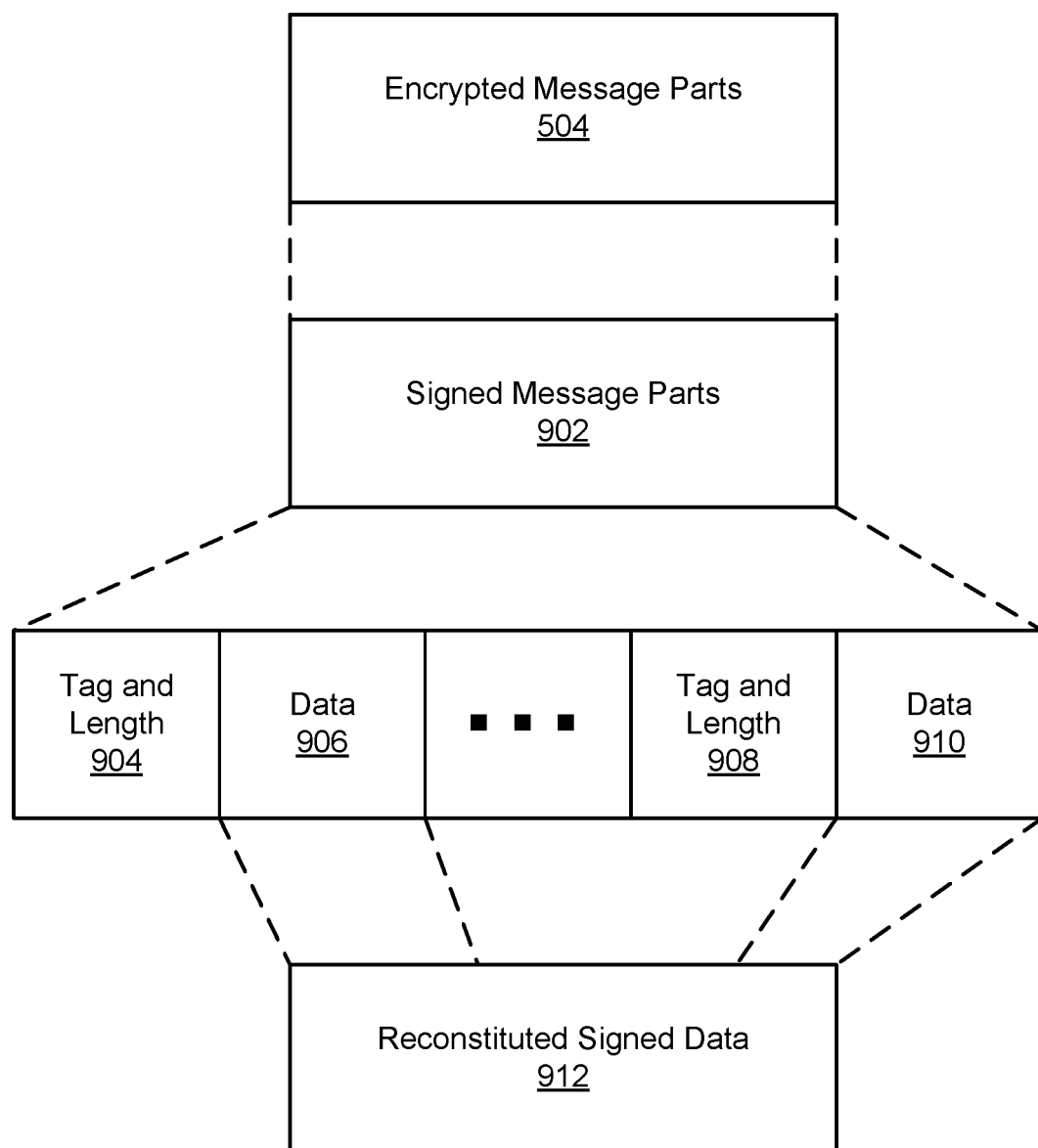
FIG. 9 is a diagram of an encrypted message parts field included in the data field shown in FIG. 5, fields included in the encrypted message parts field, and reconstituted signed data generated based on the encrypted message parts field, according to an example implementation.

FIG. 9 is a diagram of an encrypted message parts field 504 included in the data field 414 shown in FIG. 5, fields included in the encrypted message parts field 504, and reconstituted signed data 912 generated based on the encrypted message parts field 504, according to an example implementation. In this example, the decrypter 204 may decrypt the encrypted message parts 504 to generate signed message parts 902. The parser 202 may parse the signed message parts 902 into tag and length fields 904, 908 paired with data fields 906, 910. The tag and length fields 904, 908 may indicate lengths of lines included in the message 400. The reconstituter 205 may reconstitute the data fields 906, 910 based on the lengths indicated by the tag and length fields 904, 908 to generate reconstitute signed data 912.

In an example described with respect to FIGS. 4-6 and 9, the original message 400 may include the primary header 402 and the primary body 404, and the decrypted message may be made up of the primary header 402 and the reconstituted signed data 912. The primary header 402 and reconstituted signed data 912 may be sufficient for the message displayer 212 to display the message 400 to a user in response to a read request from the user. The computing system 200 may store in long-term storage 224, and use to regenerate the original message 400 in response to a request to send and/or forward the message 400 to a third party, the S/MIME headers included in the header 412, the length indicators included in the tag and length fields 904, 908, the CMS header 502, and the CMS trailer 506.

Figure 10:
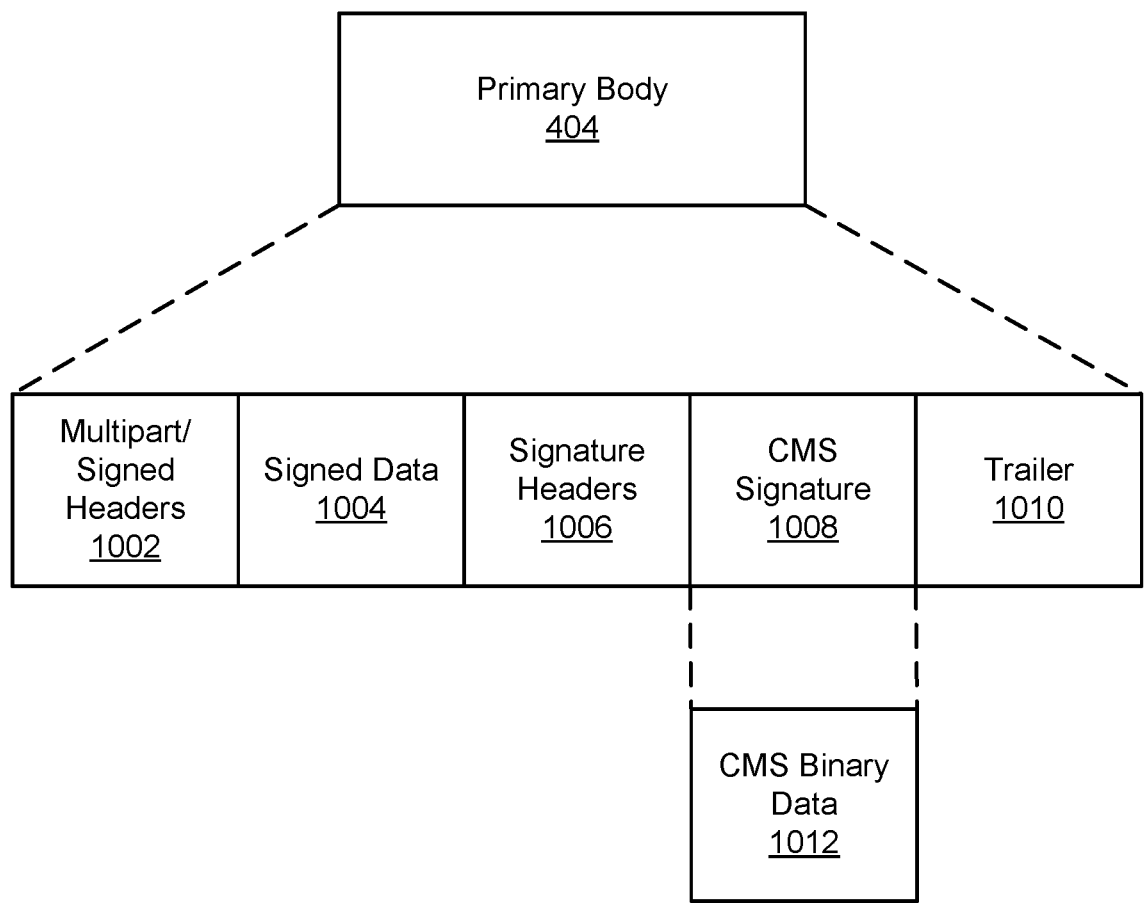
FIG. 10 is a diagram of a primary body included in the message shown in FIG. 4 according to another example implementation.

FIG. 10 is a diagram of the primary body 404 included in the message 400 shown in FIG. 4 according to another example implementation. In this example, the parser 202 may parse the primary body 404 into multipart/signed headers 1002, signed data 1004, signature headers 1006, a CMS signature 1008 (which may be a Base64 Encoded CMS signature) which may include line length indicators, and a trailer 1010. The computing system 200 may generate CMS binary data 1012 from the CMS signature 1008 by decoding the CMS signature 1008 according to a known encoding scheme, such as Base64 encoding. The CMS binary data may include information enabling each recipient to decrypt the encrypted symmetric key 616, symmetric key, and/or a content encryption key.

In an example described with respect to FIGS. 4 and 10, the original message 400 may include the primary header 402 and the multipart/signed headers 1002, the signed data 1004, the signature headers 1006, the CMS signature 1008, and the trailer 1010. The primary header 402 and the multipart/signed headers 1002, the signed data 1004, the signature headers 1006, the CMS signature 1008, and the trailer 1010 may be sufficient for the message displayer 212 to display the message 400 to a user in response to a read request. The computing system 200 may store in long-term storage 224, and use to regenerate the original message 400 in response to a request to send and/or forward the message 400 to a third party, the multipart signed headers 1002, the signature headers 1006, the line length indicators included in the CMS signature 1008, the trailer 1010, and the CMS binary data 1012.

Figure 11:
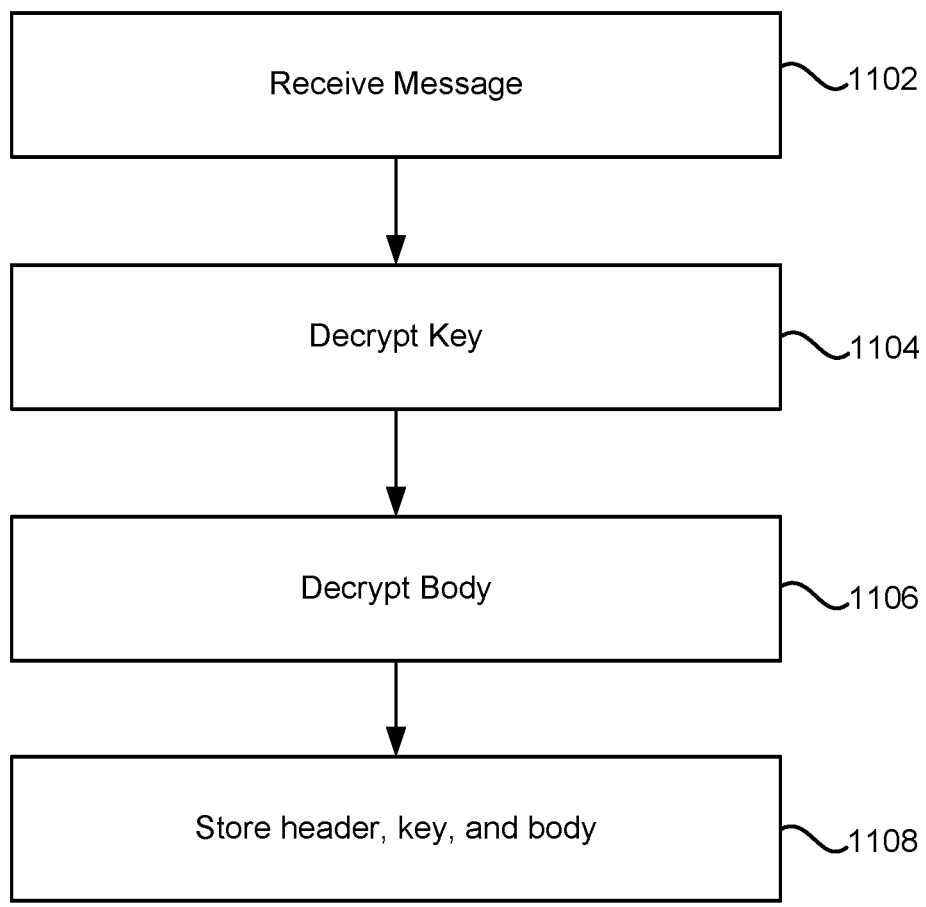
FIG. 11 is a flowchart of a method according to an example implementation.

FIG. 11 is a flowchart of a method 1100 according to an example implementation. According to this example, the method 100 may include receiving a message (1102). The message may include a header, an encrypted symmetric key, and an encrypted body. The method 1100 may also include decrypting the encrypted symmetric key (1104). The symmetric key may be decrypted using a private key to generate a decrypted symmetric key. The method 1100 may also include decrypting the encrypted body (1106). The body may be decrypted using the decrypted symmetric key to generate a decrypted body. The method 1100 may also include storing the header, the decrypted symmetric key, and the decrypted body in long-term storage (1108).

According to an example implementation, the receiving the message (1102) may include receiving an email message via an electronic network.

According to an example implementation, the method 1100 may further include re-encrypting the decrypted symmetric key to generate a re-encrypted symmetric key, and the storing of the decrypted symmetric key may include storing the re-encrypted symmetric key.

According to an example implementation, the method 1100 may further include responding to a request to read the message by displaying the stored decrypted body.

According to an example implementation, the method 1100 may further include responding to a request to read the message by retrieving the header and the decrypted body from the long-term storage and displaying the header and the stored decrypted body.

According to an example implementation, the method 1100 may further include responding to a request to forward the message to a recipient by re-encrypting the decrypted body using the decrypted symmetric key, re-encrypting the decrypted symmetric key using a public key associated with the private key, and sending the header, the re-encrypted symmetric key, and the re-encrypted body to the recipient.

According to an example implementation, the method 1100 may include not storing the encrypted body after decrypting the encrypted body.

According to an example implementation, the long-term storage may include a magnetic disk.

According to an example implementation, the long-term storage may include a flash drive.

Figure 12:
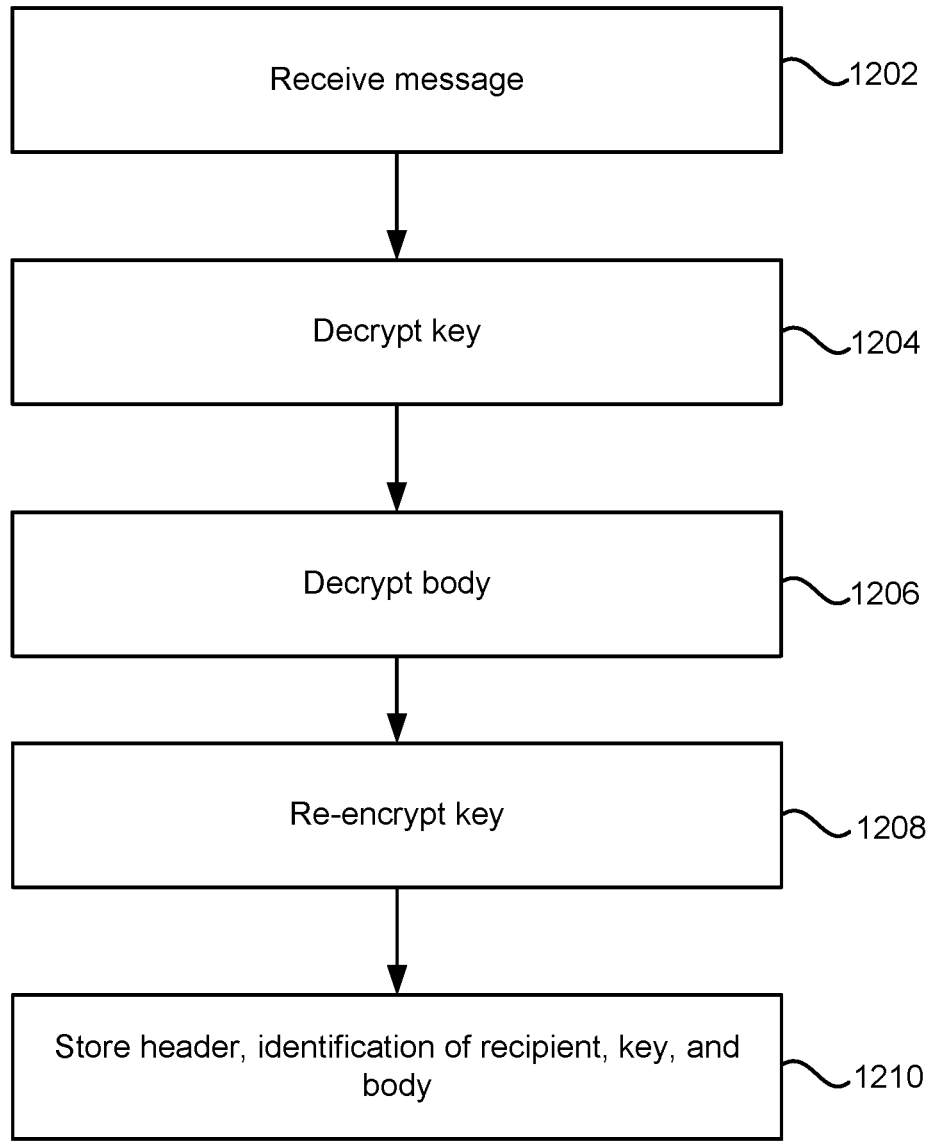
FIG. 12 is a flowchart of a method according to another example implementation.

FIG. 12 is a flowchart of a method 1200 according to another example implementation. According to this example, the method 1200 may include receiving a message (1202). The message may include a primary header including a sender of the message and a recipient of the message, a cryptographic message syntax (CMS) header identifying at least one recipient and including at least one encrypted copy of a symmetric key encrypted according to a public key associated with the at least one recipient, and an encrypted body encrypted according to the symmetric key. The method 1200 may also include decrypting a key (1204). Decrypting the key may include decrypting the at least one encrypted copy of the symmetric key using a private key associated with the at least one recipient to generate a decrypted symmetric key. The method 1200 may include decrypting the encrypted body (1206), such as by using the decrypted symmetric key to generate a decrypted body. The method 1200 may also include re-encrypting the decrypted symmetric key (1208), to generate a re-encrypted symmetric key. The method 1200 may also include storing the primary header, the identification of the at least one recipient, the re-encrypted symmetric key, and the decrypted body, in long-term storage (1210).

According to an example implementation, the CMS header may include at least a first identifier, identifying a first recipient, and a first copy of the symmetric key, the first copy of the symmetric key being encrypted according to a first public key associated with the first recipient, and a second identifier, identifying a second recipient, and a second copy of the symmetric key, the second copy of the symmetric key being encrypted according to a second public key associated with the second recipient. In this example, the decrypting the at least one encrypted copy of the symmetric key may include decrypting the first copy of the symmetric key using a first private key associated with the first recipient to generate the decrypted symmetric key. In this example, the storing the identification of the at least one recipient may include storing the first identifier and the second identifier in the long-term storage.

According to an example implementation, the decrypted body may include length indicators indicating lengths of lines of data in the decrypted body, and the method 1200 may further include storing the length indicators in the long-term storage.

According to an example implementation, the message may further include at least one Secure/Multipurpose Internet Mail Extensions (S/MIME) header, and the method 1200 may further include storing the at least one S/MIME header.

According to an example implementation, the message may further include a CMS trailer.

According to an example implementation, the method 1200 may further include erasing the encrypted body after decrypting the encrypted body.

According to an example implementation, the method 1200 may further include responding to a request to read the message by displaying the stored decrypted body.

According to an example implementation, the method 1200 may further include responding to a request to read the message by retrieving the header and the decrypted body from the long-term storage and displaying the header and the stored decrypted body.

According to an example implementation, the method 1200 may further include responding to a request to forward the message to the at least one recipient by re-encrypting the decrypted body using the decrypted symmetric key, re-generating the encrypted copy of the symmetric key, and sending the primary header, the re-generated symmetric key, and the re-encrypted body to the recipient.

According to an example implementation the re-generating the encrypted copy of the symmetric key may include decrypting the re-encrypted symmetric key according to a key associated with the computing system, and re-encrypting the symmetric key according to the public key associated with the at least one recipient.

Figure 13:
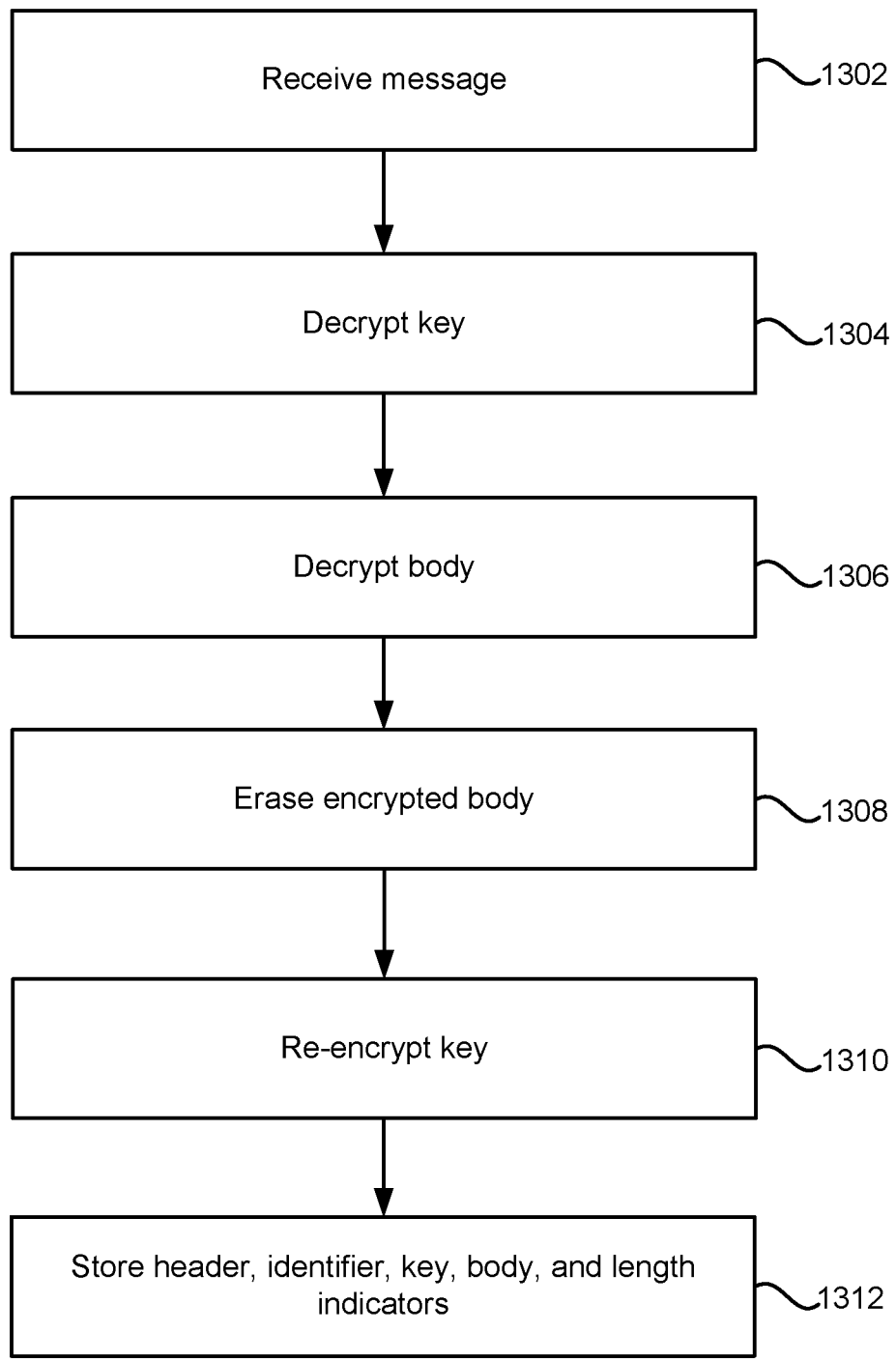
FIG. 13 is a flowchart of a method according to another example implementation.

FIG. 13 is a flowchart of a method 1300 according to another example implementation. According to this example, the method 1300 may include receiving a message (1302). The message may include a primary header including a sender of the message and a recipient of the message, a cryptographic message syntax (CMS) header including at least a first identifier, identifying a first recipient, and a first copy of a symmetric key, the first copy of the symmetric key being encrypted according to a first public key associated with the first recipient, and a second identifier, identifying a second recipient, and a second copy of the symmetric key, the second copy of the symmetric key being encrypted according to a second public key associated with the second recipient, and an encrypted body encrypted according to the symmetric key. The method 1300 may further include decrypting the first copy of the symmetric key using a private key associated with the first recipient to generate a decrypted symmetric key (1304). The method 1300 may further include decrypting the encrypted body using the decrypted symmetric key to generate a decrypted body, the decrypted body including length indicators indicating lengths of lines of data in the decrypted body (1306). The method 1300 may further include erase the encrypted body after decrypting the encrypted body (1308). The method 1300 may further include re-encrypting the decrypted symmetric key, using a key associated with the computing system, to generate a re-encrypted symmetric key (1310). The method 1300 may further include storing the primary header, the first identifier, the second identifier, the re-encrypted symmetric key, the decrypted body, and the length indicators, in long-term storage (1312). The method 1300 may further include responding to a request to read the message by displaying the stored decrypted body, and responding to a request to forward the message to a forwarding recipient by re-encrypting the decrypted body using the re-encrypted symmetric key, re-generating the first copy of the symmetric key, the regenerating the first copy of the symmetric key including decrypting the re-encrypted symmetric key according to the key associated with the computing system and re-encrypting the symmetric key according to a public key associated with the first recipient and corresponding to the private key associated with the first recipient, and sending the primary header, the re-generated symmetric key, and the re-encrypted body to the recipient.

FIG. 14 shows an example of a generic computer device 1400 and a generic mobile computer device 1450, which may be used with the techniques described here. Computing device 1400 is intended to represent various forms of digital computers, such as laptops, desktops, workstations, personal digital assistants, servers, blade servers, mainframes, and other appropriate computers. Computing device 1450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. Each of the components 1402, 1404, 1406, 1408, 1410, and 1412, are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468, are interconnected using various buses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provide in communication with processor 1452, so as to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single In Line Memory Module) card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provide as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, or memory on processor 1452, that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, WiFi, or other such transceiver (not shown). In addition, GPS (Global Positioning System) receiver module 1470 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1480. It may also be implemented as part of a smart phone 1482, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
    receiving a message, the message including a header, an encrypted symmetric key, and an encrypted body;
    decrypting the encrypted symmetric key using a private key to generate a decrypted symmetric key;
    decrypting the encrypted body using the decrypted symmetric key to generate a decrypted body;
    storing the decrypted symmetric key in long-term storage;
    storing an identification of a recipient of the message, in association with the decrypted symmetric key, in the long-term storage;
    displaying the decrypted body; and
    responding to a request to forward the message to the recipient by:
        re-encrypting the decrypted body using the decrypted symmetric key;
        re-encrypting the decrypted symmetric key; and
        sending the header, the re-encrypted body, and the re-encrypted symmetric key to the recipient.

2. The method of claim 1, wherein the receiving the message includes receiving an email message via an electronic network.

3. The method of claim 1, wherein the displaying the decrypted body comprises displaying the decrypted body in response to a request to read the message.

4. The method of claim 1, wherein the displaying the decrypted body comprises responding to a request to read the message by retrieving the header and the decrypted body from long-term storage and displaying the header and the decrypted body.

5. The method of claim 1, wherein the method comprises not storing the encrypted body after decrypting the encrypted body.

6. The method of claim 1, further comprising erasing the encrypted body after decrypting the encrypted body.

7. The method of claim 1, wherein the header of the message includes the identification of the recipient of the message.

8. A non-transitory computer-readable storage medium comprising instructions stored thereon that, when executed by at least one processor, are configured to cause a computing system to at least:
    receive a message, the message including a header, an encrypted symmetric key, and an encrypted body;
    decrypt the encrypted symmetric key using a private key to generate a decrypted symmetric key;
    decrypt the encrypted body using the decrypted symmetric key to generate a decrypted body;
    store the decrypted symmetric key in long-term storage;
    store an identification of a recipient of the message, in association with the decrypted symmetric key, in the long-term storage;
    display the decrypted body; and
    respond to a request to forward the message to the recipient by:
        re-encrypting the decrypted body using the decrypted symmetric key;
        re-encrypting the decrypted symmetric key; and
        sending the header, the re-encrypted body, and the re-encrypted symmetric key to the recipient.

9. The non-transitory computer-readable storage medium of claim 8, wherein the receiving the message includes receiving an email message via an electronic network.

10. The non-transitory computer-readable storage medium of claim 8, wherein the displaying the decrypted body comprises displaying the decrypted body in response to a request to read the message.

11. The non-transitory computer-readable storage medium of claim 8, wherein the displaying the decrypted body comprises responding to a request to read the message by retrieving the header and the decrypted body from long-term storage and displaying the header and the decrypted body.

12. The non-transitory computer-readable storage medium of claim 8, wherein the instructions are further configured to cause the computing system to not store the encrypted body after decrypting the encrypted body.

13. The non-transitory computer-readable storage medium of claim 8, wherein the instructions are further configured to cause the computing system to erase the encrypted body after decrypting the encrypted body.

14. The non-transitory computer-readable storage medium of claim 8, wherein the header of the message includes the identification of the recipient of the message.

15. A computing system comprising:
    at least one processor; and
    a non-transitory computer-readable storage medium comprising instructions stored thereon that, when executed by at least one processor, are configured to cause the computing system to at least:
        receive a message, the message including a header, an encrypted symmetric key, and an encrypted body;
        decrypt the encrypted symmetric key using a private key to generate a decrypted symmetric key;
        decrypt the encrypted body using the decrypted symmetric key to generate a decrypted body;
        store the decrypted symmetric key in long-term storage;
        store an identification of a recipient of the message, in association with the decrypted symmetric key, in the long-term storage;
        display the decrypted body; and respond to a request to forward the message to the recipient by:
- re-encrypting the decrypted body using the decrypted symmetric key;
- re-encrypting the decrypted symmetric key; and
- sending the header, the re-encrypted body, and the re-encrypted symmetric key to the recipient.

16. The computing system of claim 15, wherein the receiving the message includes receiving an email message via an electronic network.

17. The computing system of claim 15, wherein the displaying the decrypted body comprises displaying the decrypted body in response to a request to read the message.

18. The computing system of claim 15, wherein the displaying the decrypted body comprises responding to a request to read the message by retrieving the header and the decrypted body from long-term storage and displaying the header and the decrypted body.

19. The computing system of claim 15, wherein the instructions are further configured to cause the computing system to erase the encrypted body after decrypting the encrypted body.

20. The computing system of claim 15, wherein the header of the message includes the identification of the recipient of the message.

* * * * *